United States Patent
MacLeod et al.

(10) Patent No.: US 6,819,023 B1
(45) Date of Patent: Nov. 16, 2004

(54) MAGNETIZING APPARATUS

(75) Inventors: Donald J. MacLeod, Santa Cruz, CA (US); Greg Zariphopoulos, Evanston, IL (US); Robert M. Pelstring, Santa Cruz, CA (US); Alain Cassat, Pully (CH); Gunter Karl Heine, Aptos, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/631,438

(22) Filed: Aug. 2, 2000

Related U.S. Application Data

(60) Division of application No. 09/198,047, filed on Nov. 23, 1998, now abandoned, which is a continuation-in-part of application No. 09/158,641, filed on Sep. 22, 1998, now Pat. No. 6,124,776, and a continuation-in-part of application No. 08/893,626, filed on Jul. 11, 1997, now abandoned.

(51) Int. Cl.[7] .............................................. H02K 21/12
(52) U.S. Cl. ................... 310/156.43; 335/284; 361/143
(58) Field of Search .......................... 335/284; 29/607; 361/143; 310/156.01, 156.38, 156.43, 156.44, 156.45, 51, 156

(56) References Cited

U.S. PATENT DOCUMENTS

| | | | | |
|---|---|---|---|---|
| 2,248,272 A | * | 7/1941 | Jurak | 335/284 |
| 3,335,377 A | * | 8/1967 | Kohlhagen | 310/156.43 |
| 3,417,295 A | * | 12/1968 | Littwin | 335/284 |
| 4,166,263 A | * | 8/1979 | Harada et al. | 335/284 |
| 4,614,929 A | * | 9/1986 | Tsukuda et al. | 335/284 |
| 5,025,240 A | * | 6/1991 | La Croix | 335/284 |
| 5,075,814 A | * | 12/1991 | Kubota et al. | 361/143 |
| 5,200,729 A | * | 4/1993 | Soeda et al. | 335/284 |
| 5,557,248 A | * | 9/1996 | Prochazka | 335/284 |
| 5,659,280 A | * | 8/1997 | Lee et al. | 335/284 |
| 6,124,776 A | * | 9/2000 | Aiello et al. | 310/51 |

* cited by examiner

*Primary Examiner*—Dang Le
(74) *Attorney, Agent, or Firm*—Raghunath S. Minisandram; Jesus Del Castillo

(57) ABSTRACT

A circular magnetizer is disclosed comprising circular insulating inset holding pans of axially disposed wires, each pair carrying a current oppositely directed from the adjacent pair, the insert being disposed within and facing a back iron across a circular gap of sufficient width to allow a circular magnet to be disposed therein and spaced by a gap from the insert and/or back iron. The pan's of wires are arranged to create flux lines which will establish alternating magnetic poles separated by null zones in the magnet.

4 Claims, 8 Drawing Sheets

MAGNETIZER DESIGN FOR WIDE TRANSITION OR "DEAD ZONE"

NULL ZONE CREATED BY OPPOSING
FIELD CONDUCTOR PLACEMENT

MAGNETIZING APPARATUS

CROSS-REFERENCE TO RELATED APPLICATIONS

This divisional application claims priority to U.S. application Ser. No. 09/198,047 filed Nov. 23, 1998 now abandoned.

This application which is a continuation-in-part of U.S. application Ser. No. 09/158,641, filed Sep. 22, 1998 now U.S. Pat. No. 6,124,776 by Aiello et al., and is a continuation-in-part of U.S. application Ser. No. 08/893,626 filed Jul. 11, 1997 now abandoned by Williams et al., both incorporated herein by reference.

FIELD OF THE INVENTION

This invention relates generally to a brushless DC motor having a cylindrical air gap between rotor and stator, and especially designed for use for driving a rotating hard disc in a hard disc drive.

BACKGROUND OF THE INVENTION

In permanent magnet motors, interfering or parasitic torques may develop because of the interaction between the edges of the magnetized poles and the slots of the stator. In small size motors, such as are used in disc drives, these problems can be even greater. The radial thinness of the rotor magnet is required by the limited diameter of the motor itself In such a small, high power motor, the air gap between the facing surfaces of the stator and rotor must also be minimized. The combination of high induction, the slotted stator, the minimal air gap, and the thinness of all the elements can easily lead to so-called torque unevenness or torque ripple.

The resulting running torque ripple in the motor is a source of audible noise. Since the disc drive is used in computers, such audible noise must be reduced in order for the product to be commercially successful.

It has been recognized that the reduction of torque ripple is an important goal. One current method known of reducing torque ripple is designing the spindle motor to have a trapezoidal back EMF (BEMF) wave form. Current methods used to achieve such trapezoidal BEMF include weak magnetization of the magnet pole center, or selection of stator slot/number/magnetic pole member. For example, it is disclosed in European patent 291,219, U.S. Pat. No. 8,847,712 Issued Jul. 11, 1989, that the number of stator poles should be kept approximately the same as the number of rotor poles. This is also taught to reduce torque fluctuations during starting or idling. However, in general according to the reference, this method requires at least nine wound coils per motor.

A problem with this approach is that in most known spindle motor configurations, other design considerations dictate the number of poles and slots to be used and the numbers are usually different. The selection of the number and arrangement of the poles and slots in most disc drive spindle motors is dictated by other considerations than the shape of the back EMF wave form.

Thus, the problem remains of providing a motor design which minimizes running torque ripple while remaining consistent with other design considerations for an efficiently operating disc drive spindle motor.

Another objective of the invention is to provide a motor design with by reduced running torque ripple, even though the number of slots may be dramatically different.

SUMMARY OF THE INVENTION

Therefore it is a primary general objective of the present invention to provide a permanent magnet excited motor having reduced running torque ripple in order to diminish the audible noise generated by the motor.

It is a further objective of the invention to provide a motor especially for use as a spindle motor in a disc drive which has a design providing reduced running torque ripple while remaining consistent with other design objectives of a disc drive spindle motor.

A further objective of the invention is to provide reduced running torque ripple by shaping and measuring the back EMF ripple of the motor as providing an accurate representation of the running torque ripple.

These and other objectives of the present invention are achieved by shaping the magnetization wave form created by the interaction between the rotating magnet of an outer rotor magnet supporting hub rotating past a slotted stator normally energized in the normal fashion. The magnetization wave form is shaped to provide a back ENT shape with a substantially flat top when a two phase wave form for a standard three phase motor is studied. It has been recognized that in this type of motor, this back EMF wave form shape will minimize torque ripple. The flat peak is achieved by adding shoulders to a standard single phase wave form, by providing a ten to fifteen percent null zone between each magnetic pole. This may be achieved alternatively by providing a solid magnet which is magnetized to establish a null zone; by molding the magnet in essentially a cylindrical shape with teeth, each tooth being aligned to create a magnetic pole during magnetization, with the air gap between the teeth creating the desired transition zone, or by scalloping the magnets inner diameter at the desired pole transition zones.

Other details and advantages of the present invention will become apparent to a person of skill in this field who studies the following figures in conjunction with the description of a preferred embodiment or embodiments.

BRIEF DESCRIPTION OF THE DRAWINGS

FIG. 2B is a graph showing a single phase back EMF wave form; whereas

DETAILED DESCRIPTION OF THE PREFERRED EMBODIMENT

Figure 1:
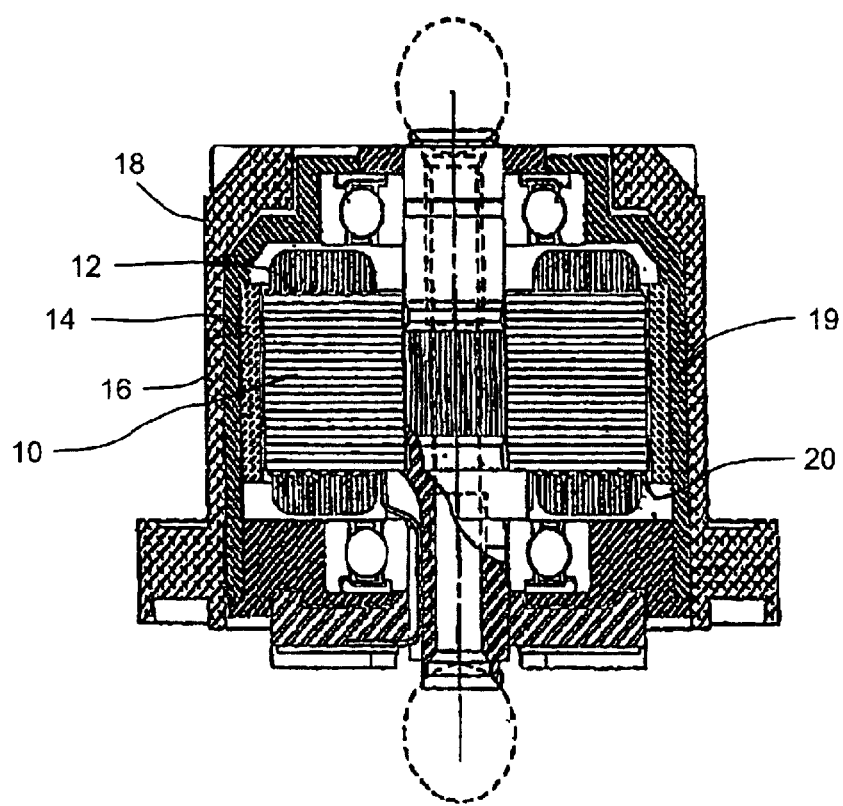
FIG. 1 is a vertical sectional view of a typical motor in which various embodiments of the present invention may be used.

FIG. 1 is a vertical sectional view of a typical motor with which any of the embodiments of the present invention could be used with a reduction in running torque ripple of the motor. The many details of the motor of course are not significant to the present invention but it is sufficient to note that it is a typical three phase motor of a type well known in the disc drive field, having a stator 10 supporting coils 12, interacting with a magnet 14 which is supported on the interior surface of an external hub 16. A disc or discs are supported on the exterior surface 18 of the motor for rotation at constant speed. A finite gap 20 is defined between the stator and the motor i.e., bordered by the stator 10 on one side and the permanent magnets 14 on the opposite side.

The magnets 14 in such a motor are cylindrical in shape and comprise alternating north/south poles, with a transition region between each pole. For reasons explained above and already well known in this field, such a design is a well known source of running torque ripple because of the effects of the interaction between the magnetic poles and the stator as the transition edges of the magnetic poles pass the gaps in the stator.

Figure 2A:
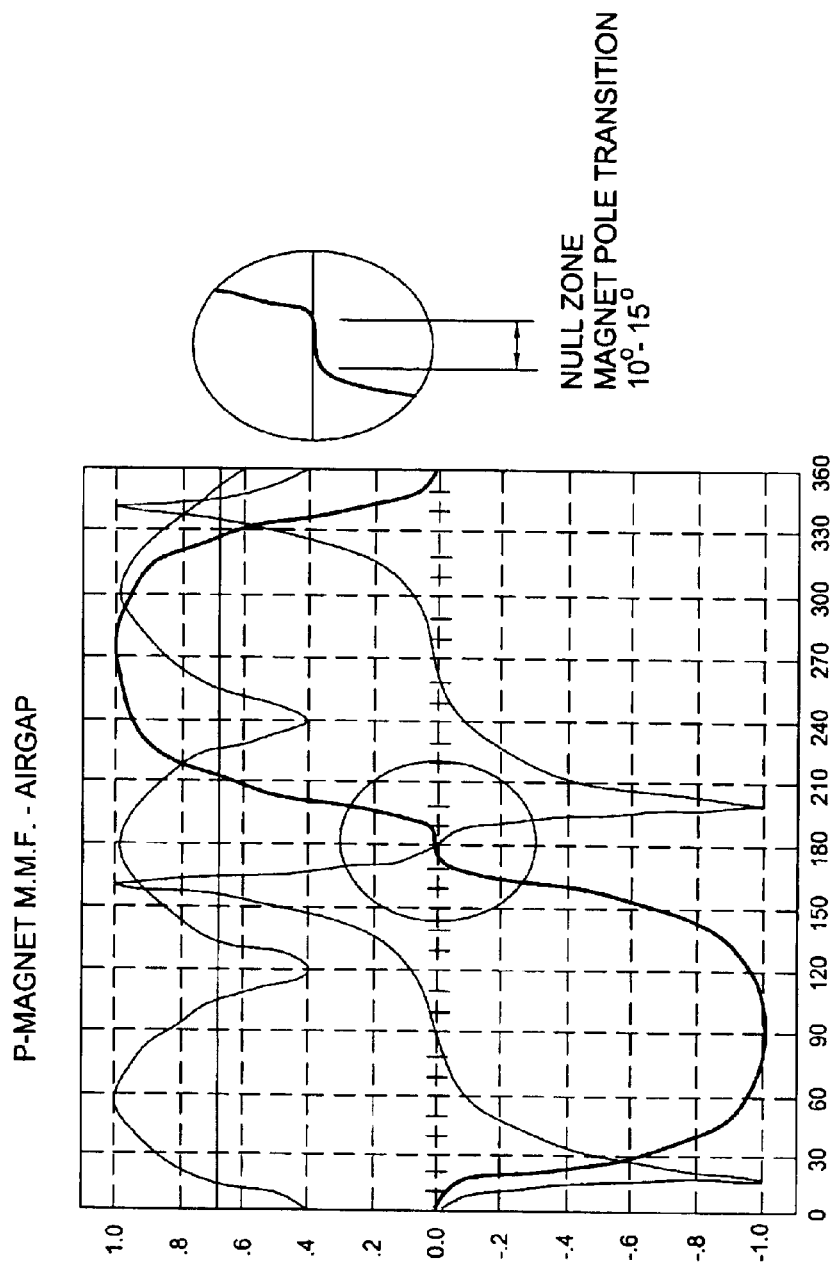
FIG. 2A is a graph of the permanent magnet MMF measured for one phase of the motor.
Figure 2B:
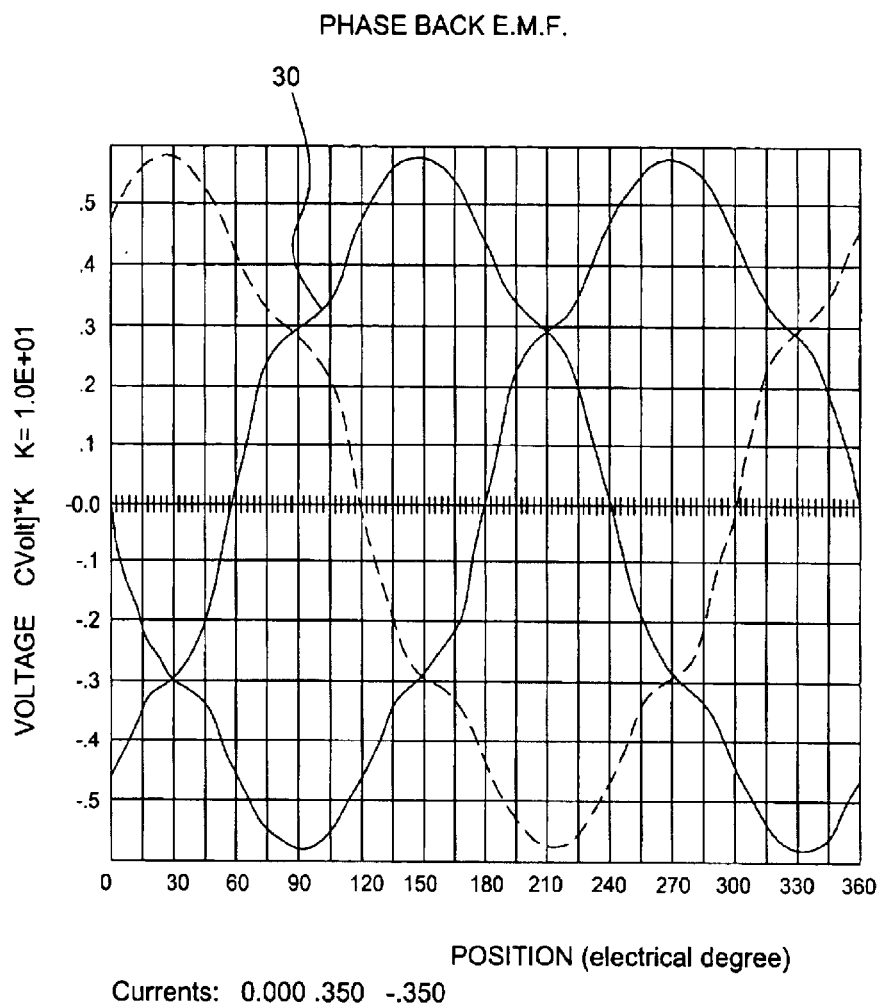
Figure 3:
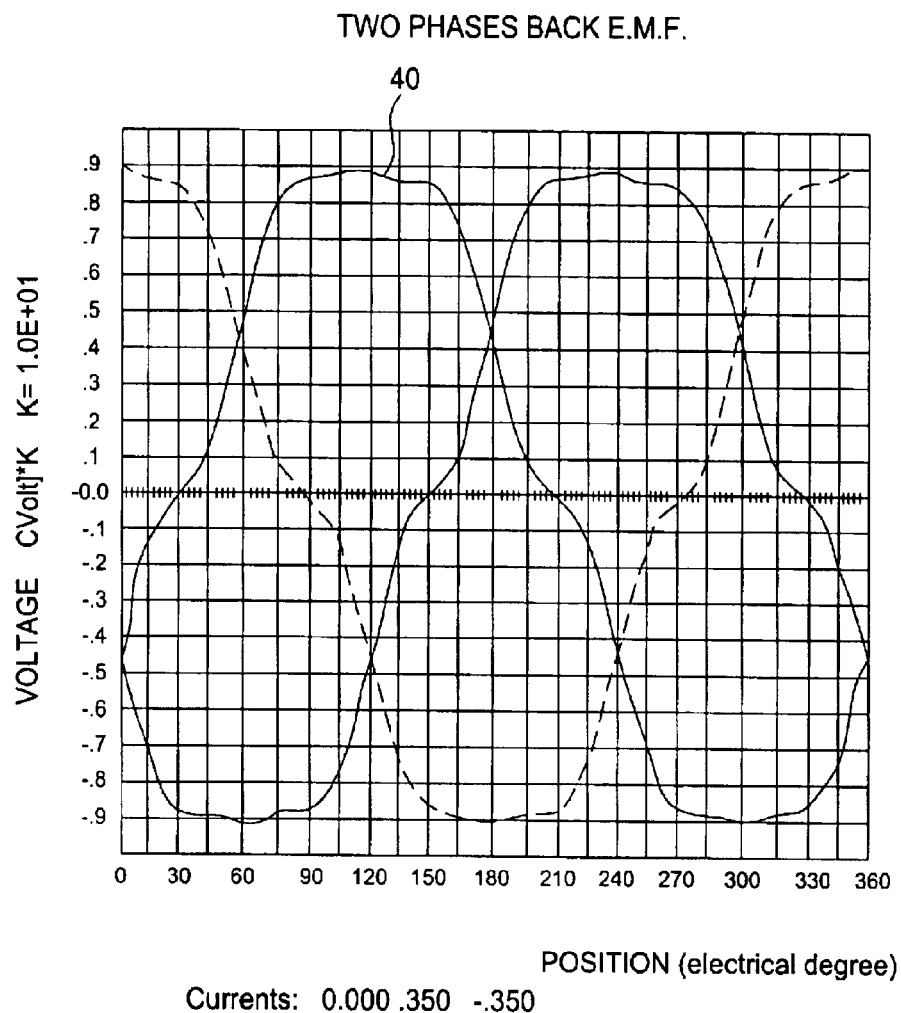
FIG. 3 shows the combined effect of the back EMF of two phases in a motor utilizing a present invention.
Figure 4A:
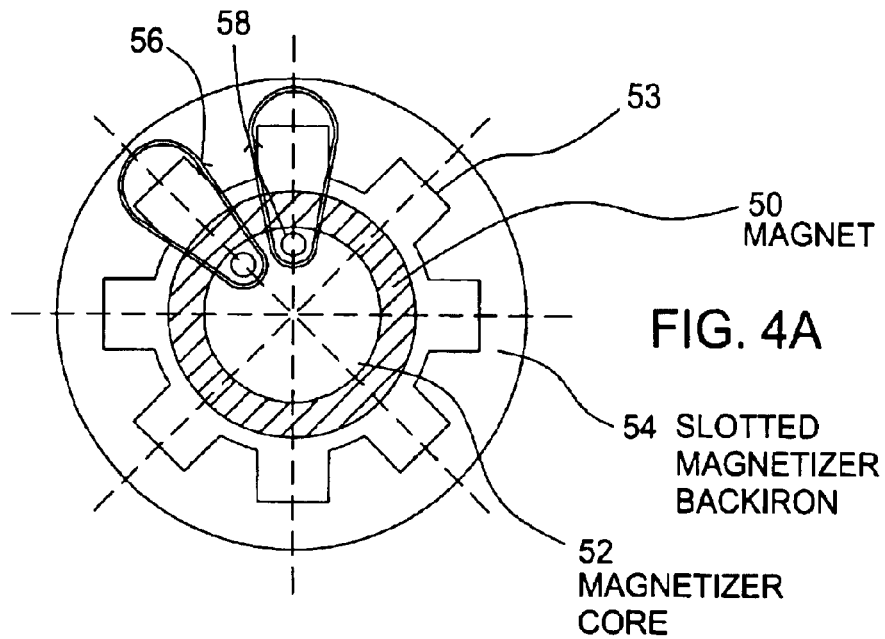
FIGS. 4A and 4B show a magnetizer for magnetizing a magnet having a magnet having the characterizations of the present invention.
Figure 4B:
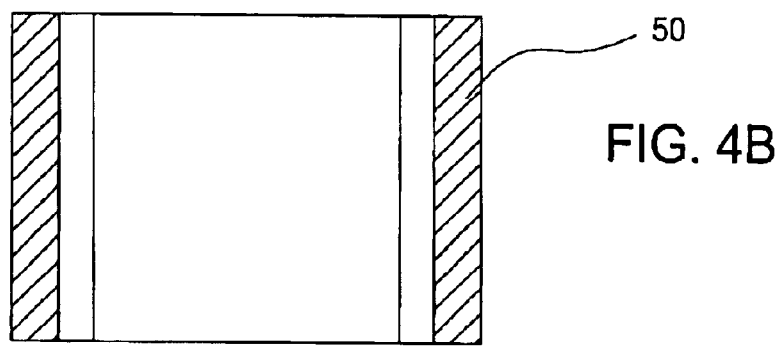

In this improved motor, the magnets shown in FIGS. 3 and 4 are designed to exhibit an MMF across the air gap which incorporates a null zone in the transition region between the north and south poles. Preferably, this null zone should be about 10 to 15 degrees as shown in FIG. 2A; it may be referred to as an "inflection" in the waveform. It has been determined that running torque ripple is minimized, if the combined back EMF wave form for two or more phases has a roughly trapezoidal shape. A multi-phase motor with a segmented magnet having a ten to fifteen percent null zone between poles generates in a back EMF shape where a single phase with shoulders generally indicated at 30 as shown in FIG. 3. Combining the back EMF from two phases provides a back EMW characteristic having a trapezoidal shape with a flat top 40 as shown in FIG. 3. The flat peak 40 results from the addition of the shoulders 30 on the single phase wave forms which, as is well known, are displaced one relative to the next so that their shoulder regions are additive.

The magnet with a null transition zone which is the essential feature of this invention may be formed by appropriate magnetization of a single cylindrical piece of magnetizable material. As shown in FIG. 4, a cylindrical magnet 50 is placed in a magnetizer comprising the magnetizer core 52 and a slotted magnetizer back iron 54. The magnetizer shown in FIG. 4 includes a sequence of coils, a typical one of which is represented by the "x" and "." 56, 58 representing the current flow into and out of the page flowing through the coil which in turn establishes the magnetic field between core 52 and back iron 54 to magnetize the magnet 50 according to the desired pattern. Obviously, because of the existence of the physical slots 53 along the inner periphery of the back iron 54, there will be null transition zones of approximately the width of each slot created in the finished magnet 50. The finished magnet would then be mounted on a back iron such as back iron 19 as shown in FIG. 1.

Figure 5:
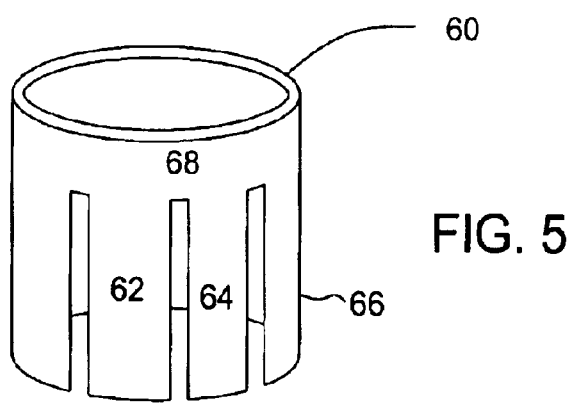
FIG. 5 shows an alternative molded magnet having the characteristics and advantages of the present invention.

An alternative approach is shown in FIG. 5 where the magnet 60 is shown molded or otherwise formed by known techniques in a cylindrical shape with teeth comprising successive poles 62, 64, 66 and so on. Each of the teeth 62, 66 would be appropriate aligned in a magnetizer to create the alternating magnetic poles; the air gaps 63 between the teeth would establish the ten to fifteen degree null transition zone.

As with the preceding embodiment, the magnet could probably be supported outside the stator windings on an appropriate back iron, with the upper solid region generally indicated at 68 forming the primary support for the magnet.

Figure 6:
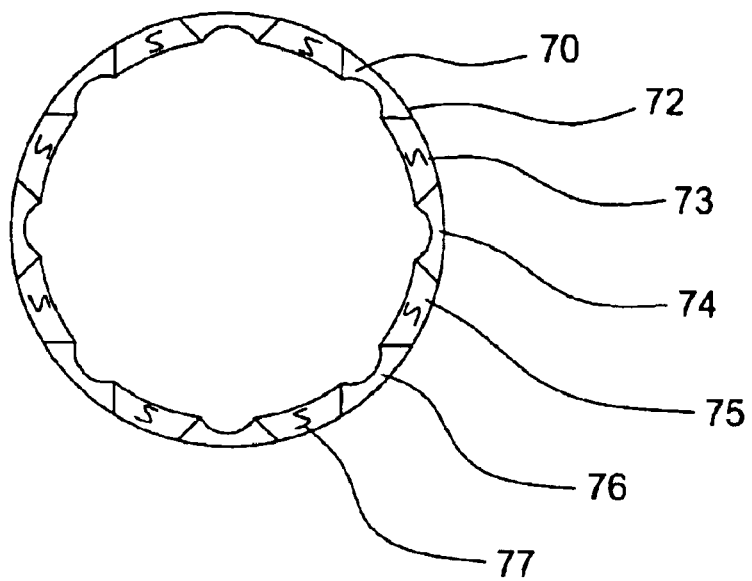
FIGS. 6 and 7 show top plan views of further alternative embodiments of the invention.

In another alternative embodiment shown in FIG. 6, the magnet inner-diameter shown in a top view would be scalloped at the pole transition zones. The scallops would of course not be effectively magnetized in the magnetizer, thereby creating the desired null transition zones between the alternating poles of the magnets 70.

Figure 7:
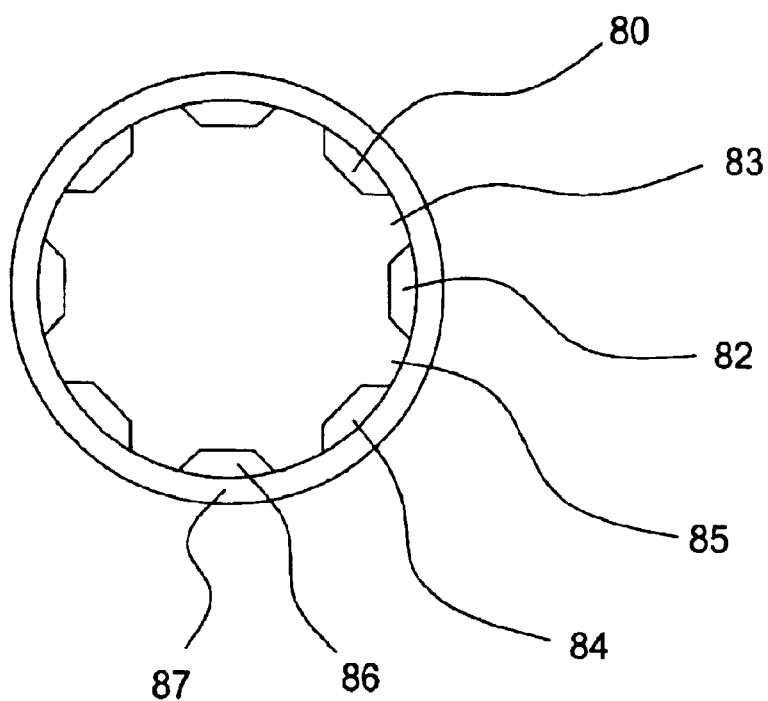

Yet another alternative is shown in FIG. 7. This shows the use of separate magnetic sections 80, 82, 84 et seq. each separate and regularly attached, spaced by a gap 85 of about 15 degrees from the next adjacent pole. The pole pieces 80–84 would be separately magnetized, and attached to a back iron 87, achieving the same function as the back iron 19 shown in the motor of FIG. 1. The spacing gaps 80, 85 would create the desired ten to fifteen degree null transition zone which provides the desired reduction in running torque ripple.

Figure 8A:
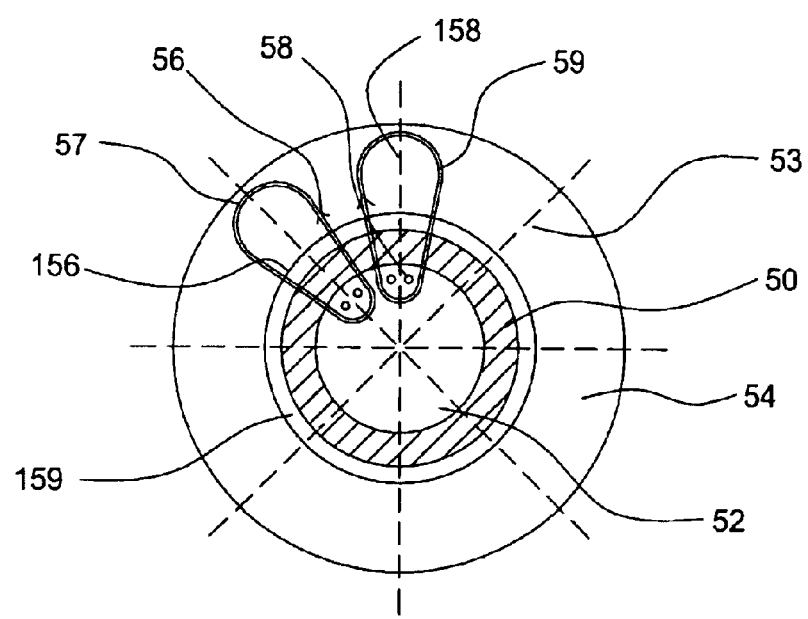
FIG. 8A is a top plan view of a magnetizer according to an embodiment of this invention.

A further improvement in creating a null zone in a magnet, using a simplified magnetizer structure, is shown in FIG. 8.

Figure 8B:
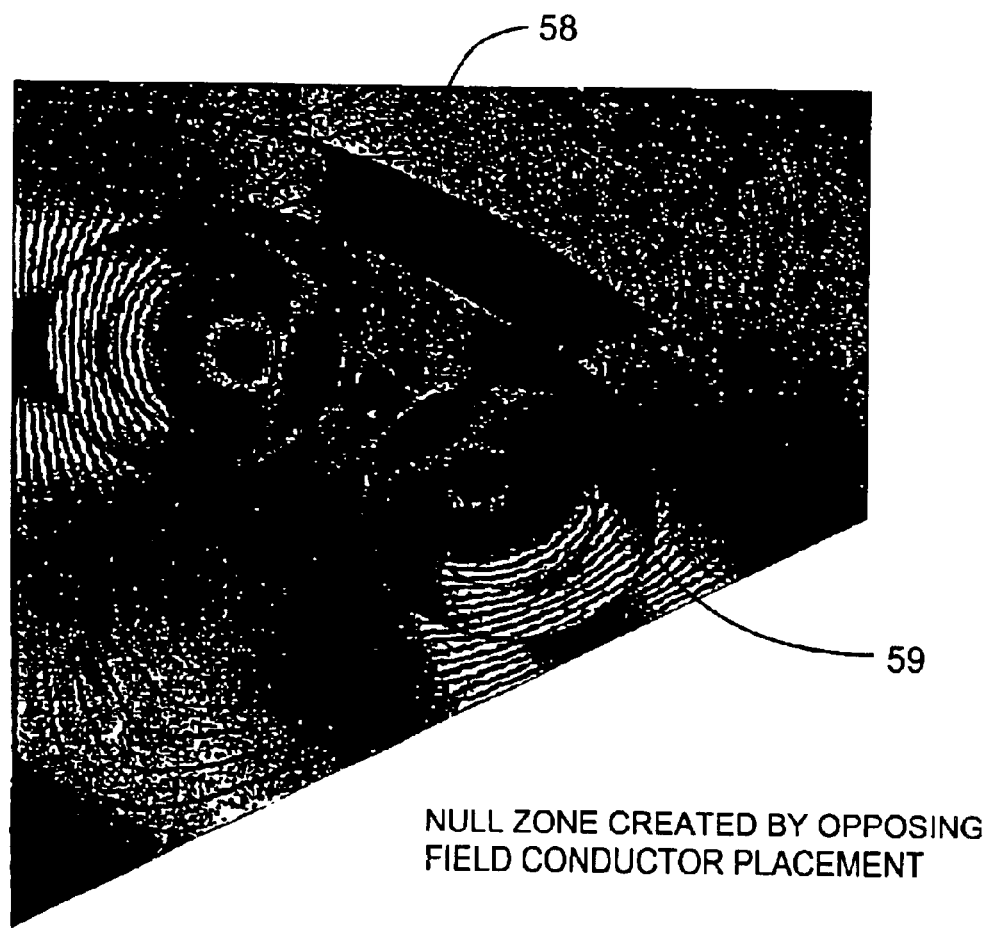
FIG. 8B is a top plan view of a portion of the magnetizer showing the resulting flux path.

In FIG. 8, the magnetizer core 52 includes paired axially directed wires of each polarity 56, 58 located close together so that flux fields 57, 59 are created around each pair of wires. A region 156, 158 which is a null zone is thereby created in the magnet 50 which is being magnetized. The flux field can also be shown in the example shown in FIG. 8B which clearly illustrates the null zone where no flux is passing through the magnet resulting in a null region.

As is well known, the conductors are buried in the magnetic core, surrounded by insulating material 52. The current through the pairs of wires is flowing into or out of the page as indicated by an "x" or a ".".

As appears in FIG. 8, the magnet 50 is separated both from the back iron 53 and the core 52 only by enough space to allow for a slip fit of the magnet into the magnetizer. However, a potential improvement lies in leaving an air gap 159 between the outer surface of the magnet and the inner surface of the back iron. This allows the transition between poles to be much more shallow reducing noise issues which might otherwise be created.

Other alternative approaches to the present invention may become apparent to a person of skill in the art who studies the present invention disclosure. Therefore, the scope of the present invention is to be limited only by the following claims.

What is claimed is:

1. A magnetizer for magnetizing a circular magnet with a null zone intermediate alternating poles comprising a circular insulating core supporting pairs of closely spaced axially directed wires, each pair of wires adapted to carry current in the same axial direction, and a back iron having no current carrying wires therein radially spaced from said circular core by a sufficient radial gap to allow said circular magnet be magnetized to slip into said radial gap, the flux being shaped to create alternating magnetic poles separated by a null zone around said circular magnet, the magnetic flux being shaped by said back iron to return through the magnet to said core.

2. A magnetizer as claimed in claim 1 wherein said radial gap is of sufficient radial extent that a portion of said radial gap remains open when said circular magnet is inserted so that said null zone of said magnet includes a softened transition zone at either end.

3. A magnetizer as claimed in claim 1, adjacent pairs of wires carrying current in opposite directions.

4. A magnetizer for magnetizing a circular magnet with a null zone intermediate alternating poles, the magnetizer comprising a back iron having no wires therein circumscribing a circular insulative inner core, the magnetizer further comprising a plurality of wire pairs axially disposed in the circular insulative inner core, each wire pair located close together, current flowing through the paired wires creating flux fields around each said wire pair thereby establishing a magnetic field between the inner core and the back iron to magnetize a magnet disposed between an inner circumference of the back iron and an outer circumference of the inner core, the null transition zones being formed in the regions of the magnet between the wire pairs where the flux is passing through the back iron and there is little flux field from the paired wires passing through the magnet.

* * * * *